United States Patent [19]

Westlake et al.

[11] E Patent Number: Re. 32,463

[45] Reissued Date of Patent: Jul. 28, 1987

[54] METHOD OF AND APPARATUS FOR TELEMETERING INFORMATION FROM A POINT IN A WELL BOREHOLE TO THE EARTH'S SURFACE

[75] Inventors: John H. Westlake, Calgary; Clifford H. Leach, Penticton; Clifford L. Ainsworth, Calgary, all of Canada

[73] Assignee: Norton Christensen, Inc., Salt Lake City, Utah

[21] Appl. No.: 92,087

[22] Filed: Nov. 6, 1979

Related U.S. Patent Documents

Reissue of:

[64] Patent No.: 4,078,620
Issued: Mar. 14, 1978
Appl. No.: 664,745
Filed: Mar. 8, 1976

[30] Foreign Application Priority Data

Mar. 10, 1975 [GB] United Kingdom ..... 09787/75

[51] Int. Cl.[4] ..... E21C 7/06
[52] U.S. Cl. ..... 175/48; 367/83
[58] Field of Search ..... 175/40, 45, 48, 50; 367/83, 84, 85; 73/151, 153

[56] References Cited

U.S. PATENT DOCUMENTS

| | | | |
|---|---|---|---|
| 2,658,284 | 11/1953 | Arps | 33/205 |
| 2,759,143 | 8/1956 | Arps | 324/1 |
| 2,859,013 | 11/1958 | Peterson | 175/45 |
| 2,887,298 | 5/1959 | Hampton | 175/217 |
| 2,901,685 | 8/1959 | Alder | 323/74 |
| 2,917,704 | 12/1959 | Arps | 324/1 |
| 2,924,432 | 2/1960 | Arps et al. | 175/45 |
| 2,925,251 | 2/1961 | Arps | 175/45 X |
| 3,062,302 | 11/1962 | Toth et al. | 175/39 |
| 3,124,882 | 3/1964 | Black | 175/45 X |
| 3,145,784 | 8/1964 | Crake | 175/40 |
| 3,302,457 | 2/1967 | Mayes | 73/152 |
| 3,309,656 | 3/1967 | Godbey | 340/18 |
| 3,466,754 | 9/1969 | Alder | 33/205 |
| 3,555,504 | 11/1971 | Fields | 137/557 X |
| 3,622,971 | 11/1971 | Arps | 340/18 |
| 3,711,825 | 1/1973 | Claycomb | 340/18 LD |
| 3,746,106 | 7/1973 | McCullough et al. | 175/45 |
| 3,747,059 | 7/1973 | Garcia | 367/83 |
| 3,764,970 | 10/1973 | Manning | 340/18 NC |
| 3,789,355 | 1/1974 | Patton | 340/18 LD |
| 3,800,277 | 3/1974 | Patton et al. | 175/48 X |
| 3,805,606 | 4/1974 | Stelzer | 73/152 |
| 3,853,184 | 12/1974 | McCullough | 175/39 |
| 3,896,667 | 7/1975 | Jeter | 73/151 |
| 3,949,354 | 4/1976 | Claycomb | 367/84 |
| 3,964,556 | 6/1976 | Gearhart et al. | 175/45 |
| 3,983,948 | 10/1976 | Jeter | 175/45 |

*Primary Examiner*—James A. Leppink
*Assistant Examiner*—Bruce M. Kisliuk
*Attorney, Agent, or Firm*—Banner, Birch, McKie & Beckett

[57] ABSTRACT

Down-hole information from rotary well drilling operations is transmitted to a surface or remote location by the venting of drilling fluid from the interior of the drill stem into the bore hole annulus in a binary coded decimal format. A valve is caused to operate by the digital output of one or more down-hole transducers thus releasing and restoring the drilling fluid pressure in the desired sequence. A "sub" contains the necessary electronics, power supply and a motorized valve assembly. Commands from the surface to transmit information from any one of the transducers are transmitted by means of sequential pulses in a binary coded decimal format, in the drilling fluid pressure are provided by the operator by deliberately decreasing and then increasing the surface pump pressure in a sequence to which the applicable down-hole actuating means is responsive.

2 Claims, 5 Drawing Figures

EFFECT OF OPENING & CLOSING DOWN-HOLE VALVE

METHOD OF AND APPARATUS FOR TELEMETERING INFORMATION FROM A POINT IN A WELL BOREHOLE TO THE EARTH'S SURFACE

Matter enclosed in heavy brackets [ ] appears in the original patent but forms no part of this reissue specification; matter printed in italics indicates the additions made by reissue.

BACKGROUND OF THE INVENTION

This invention relates to new and useful improvements in rotary well drilling operations and provides the means for transmitting desired down-hole imformation to the surface by causing the drilling rig pump pressure to depart from its normal level in sympathy with digital signals derived at a down-hole location. This is accomplished by the venting of drilling fluid from the interior of the drill stem into the borehole annulus in a binary coded decimal format, by means of a valve that is caused to operate by the digital output of one or more down-hole transducers.

In exploring for crude oil and natural gas, it is the present practice to drill wells into the earth using a "rotary" drilling technique. Under these circumstances, the drilling apparatus includes means whereby a drill string (consisting of a number of sections of hollow pipe and having a drill bit connected to the lower end) is caused to rotate, while the amount of axial force applied to the bit is carefully controlled.

While the well is being drilled, it is common practice to circulate drilling fluid (some mixtures of which are colloquially known as "mud") down through the hollow drill string, through restrictive nozzles in the bit, and back to the earth's surface through the annulus of the borehole. Upon reaching the earth's surface, the drilling fluid (containing the cuttings from the drill bit) is allowed to flow through a screening device into a series of tanks from which it is recirculated through the borehole. Besides providing the vehicle whereby cuttings are returned to the surface, the drilling fluid acts to cool and lubricate the drill bit and the exterior of the drill string. Also the drilling fluid provides a back pressure in the hole to more or less contain natural gas that may be encountered during the drilling process.

For the fluid to provide the required cleaning and cooling action with respect to the drill bit, the bit is constructed to include a number of nozzles (typically three) through which the fluid is forced at relatively high pressures. To accommodate the need for such drilling fluid pressures, the drilling apparatus includes pumps, piping, and the required swivel joint to permit the entry of the fluid into the rotating drill string.

It has become increasingly apparent to the producers of crude oil and natural gas, that means must be found to increase the efficiency of drilling operations in order to offset sharply rising costs. In part, the increased costs are due to the need to explore in geographical areas that are more and more remote from the markets for petroleum products.

Those skilled in the art of drilling wells recognize that the efficiency would improve significantly if some means could be found whereby they are advised of conditions at the bottom of the hole while drilling is in progress. For example, the bit may encounter a sloped sub-surface formation causing it to depart from the vertical and commence drilling at an angle. Or if excessive weight is inadvertently applied to the bit, the drill string will bend, again causing the hole to depart from the vertical. If the bore-hole is allowed to progress at an angle with respect to the vertical, the "target" zone may be missed altogether, and the drill string will be exposed to excessive wear due to the tangential rubbing action at the point of hole curvature.

To determine whether or not the bore-hole has departed from the vertical, it is the present practice to periodically stop drilling while a "survey" is conducted. Typically, a survey is carried out by lowering a recording inclinometer (EG: one in which the position of pendulum is photographed) down the interior of the drill string on electrically conducting wires.

Alternatively, an instrument responsive to inclination and triggered by a clockwork mechanism may be dropped into the drill string and recovered later. The former technique is expensive and time consuming, and necessitates the stopping of fluid circulation—which emphasizes the possibility of the drill string becoming stuck in the hole. The latter technique will only provide information considerably after the fact, and if the instrument happened to encounter an obstruction en route to the bottom of the hole, the clockwork mechanism may have triggered the recording too soon, thereby providing seriously misleading information.

To facilitate further research into well drilling operations, it would be useful to have other information (EG: temperature, pressure, weight on bit, etc.) telemetered from the bottom of the hole while wells are being drilled. This information would be used to more accurately predict the performance of various types of bits, the likelihood of encountering a gas bearing formation, the optimization of table RPM and weight on the bit to achieve maximum penetration rate, the mixture of mud that should be used, and the like.

Clearly, then, an instrument that will effect the transmission of down-hole information to the earth's surface, dependably, without the use of wire lines, would provide drillers with the means to significantly improve the efficiency of their operations.

Numerous attempts have been made to build a device that will provide wireless transmission from a down-hole location to the earth's surface. For example, various systems based upon the transmission of acoustical waves through the steel drill string or through the drilling fluid have been described in the prior art. However, such factors as the attenuation of the signals by the drill string immersed in the drilling fluid, bubbles in the drilling fluid, the ambient noise in the drilling apparatus, the hostility of the down-hole environment (with respect to temperature, pressure, and vibration), the transfer of energy from transducers into the transmission medium, the need for transducers into the transmission medium, the need for relatively large amounts of electrical power in the down-hole apparatus, and the need for "rugged simplicity," have, insofar as the applicants are aware, precluded the reduction of such prior art to actual use.

SUMMARY OF THE INVENTION

It is the broad object of the present invention to solve problems encountered in the prior art with respect to the transmission of information from a point in a well bore-hole to the earth's surface. This is accomplished by means of a down-hole valve assembly that permits drilling fluid to exit from the interior of the drill string and enter the bore-hole annulus, such that the pressure applied to the drilling fluid by the surface pumps will experience a significant decrease each time the valve is opened.

Transmission of information from the down-hole location is effected by selectively opening and closing the valve in sympathy with logical ones and zeroes that are obtained electronically from sub-surface transducers. At the earth's surface, the transmitted information is received by electronically detecting the variations in pump pressure caused by the opening and closing of the downhole valve. Therefore, under conditions of dynamic drilling fluid circulation, information is transmitted from a down-hole location to the earth's surface.

Another object of the present invention is to provide means whereby the down-hole instrumentation and valve assembly can be actuated on command from the surface. If the driller wishes to interrogate a sub-surface transducer that is included as an input means to the present apparatus, he can do so by deliberately decreasing and then increasing the surface pump pressure in a sequence to which the applicable down-hole actuating means is responsive.

With the foregoing objects in view, and other such objects and advantages as will become apparent to those skilled in the art to which this invention relates as this specification proceeds, [my] *our* invention consists essentially in the arrangement and construction of parts all as hereinafter more particularly described, reference being had to the accompanying drawings in which:

DESCRIPTION OF THE DRAWINGS

In the drawings like characters of reference indicate corresponding parts in the different figures.

DETAILED DESCRIPTION

Figure 1:
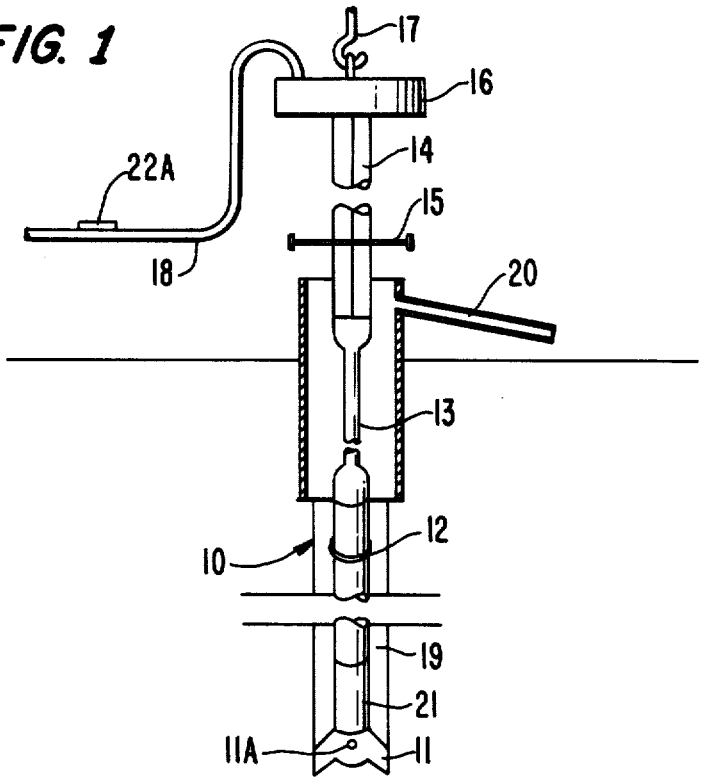
FIG. 1 is a simplified schematic view showing the rotary drilling technique, including the sub-surface instrumentation and transmitting "sub" of the present invention.

Referring now to the drawings and more particularly to FIG. 1, there is shown therein a simplified sketch of the apparatus used in a conventional rotary drilling rig. The drill string collectively designated 10, consists of a drill bit 11 affixed to the lower end, one or more drill collars 12, having a greater weight and greater mean diameter than the sections of drill pipe 13, and a "kelly" 14 having a polygon cross section.

A rotary table 15 includes a centrally located polygon shaped hole (not illustrated) to loosely accommodate the kelly 14, such that rotational movement of the table 15 causes the kelly 14, and hence the entire drill string 10, to rotate. The drill collars 12 are included to increase the weight of the drill string, such that the overall center of gravity of the drill string is located towards the bottom end.

The top end of the kelly 14 is connected to a swivel joint 16 which, in turn, is connected to a supporting hook 17. The hook is affixed to the travelling block of a "block and tackle" assembly (not illustrated) whereby the drill string 10 may be raised and lowered by means of a rig's draw-works. The swivel joint 16 permits the drill string to rotate while the hook 17 remains fixed; it also affords a means whereby drilling fluid can be injected into the interior of the drill string from a flexible mud stand-pipe 18.

The drilling fluid (mud) circulation system consists of one or more pumps (not illustrated) used to force the mud through the stand-pipe 18, through the interior of the drill string 10, through restrictive nozzles 11A in the drill bit 11, through the annulus 19, back to the earth's surface, and through a mud output flow line 20 into a series of tanks (not illustrated). The input of the pump is effected by means of a suction line into one of the mud tanks (not illustrated) thereby completing the circulatory system. All of the foregoing apparatus is conventional.

FIG. 1 shows the down-hole assembly or "sub" portion 21 of the present invention as it may be installed in the drill string 10 (typically) above the drill bit, and containing the electronic, electrical, and mechanical devices hereinafter to be described.

Figure 2:
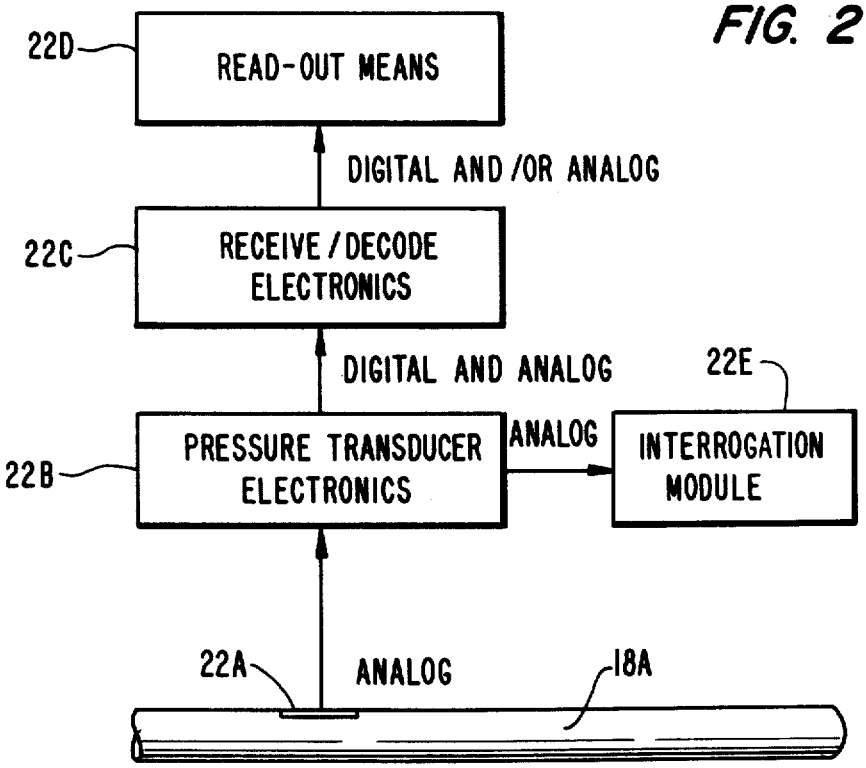
FIG. 2 is a block diagram of the surface electronic circuitry.

In FIG. 2, there is shown an arrangement of electronic circuitry that is part of the present invention and is located in some convenient place in the "on surface" rig's quarters. This circuitry operates in conjunction with the down-hole apparatus to receive, decode and read-out the information that is telemetered from the sub-surface location. Also, the surface installation includes a means of electronically interpreting the variations in pump pressure so as to facilitate the interrogation of the down-hole apparatus.

In particular, 22A is a "pressure to Voltage" transducer, well known in the art, that provides an output voltage having a magnitude that is predictably related to the pressure of the drilling fluid in the piping between the pump and the swivel joint 16. The analog signal indicative of pump pressure is processed by the pressure transducer electronics 22B for subsequent receive/-decode treatment 22C and presentation in analog and-/or digital formats in such devices as strip chart recorders and in-line digital displays 22D. The interrogation module 22E is typically located within the range of vision of the driller while he is operating the rig's controls. This interrogation module presents the driller with a visual indication of the ON/OFF pumping events he is to follow in order to interrogate the down-hole detection and transmission means. Typically, the interrogation module 22E will respond to the output of the pressure transducer 22A such that in a series of six lamps (not illustrated), the first is illuminated when the pump pressure decreases an amount consistent with the sensitivity of the down-hole pressure detecting means. Observing that the first lamp is lit, the driller re-energizes the motor driving the pump, and the subsequent pressure increase is detected by the transducer 22A. When said pressure increases an amount consistent with the down-hole system's upper pressure response point, the second lamp in the interrogation module's series is automatically illuminated, advising the driller that the interrogation sequence requires him to again cause a pressure decrease by de-activating the pump. By responding to the ON/OFF commands of the lamps within a predetermined time period (typically 30 seconds) the driller has created a series of pressure variations or "pulses" to which the down-hole instrumentation is responsive. This constitutes the remote input means operatively connected to the drilling fluid circulation system to decrease and then increase the associated pump pressure in a sequence to which said means to open and close said valve is responsive, and referred to in some of the claims. The result of such interrogation is to activate an asynchronous down-hole detection/transmission apparatus such that the magnitude of the selected sub-surface parameter is reported to the surface by the means herein described. As the circuitry for the lamp is well known, it is not deemed necessary to illustrate same. Furthermore other indicating devices could be used.

Figure 3:
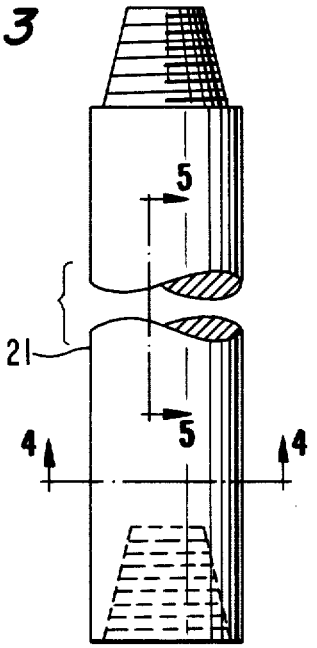
FIG. 3 is a schematic side elevation of the instrumentation and transmitting "sub".
Figure 4:
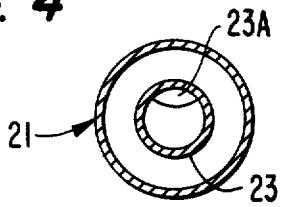
FIG. 4 is a cross section substantially along the line 4—4 of FIG. 3.
Figure 5:
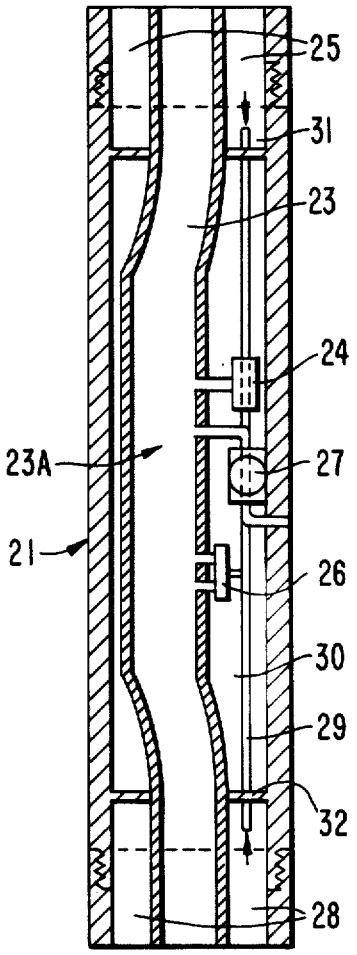
FIG. 5 is a cross-sectional schematic view showing the interior of the instrumentation and transmitting "sub" and taken substantially long the line 5—5 of FIG. 3.

In FIG. 3, there is shown an exterior view of the down-hole instrumentation and transmitting "sub" 21 of the present invention, and in FIG. 5 there is shown an interior view (section 5—5) of the "sub".

Referring now to FIG. 5, the drilling fluid flows downward through the wash-pipe 23 that has an offset section 23A for the purpose of providing space for the electro/mechanical sub-systems of the present invention.

The down-hole instrumentation is in a quiescent state until it is actuated by a command from the surface as previously described. The means whereby the down-hole instrumentation is responsive to the "command" pressure variations includes a rate of pressure change (dp/dt) switch 24 contained in an electro/mechanical cavity 30, with associated electronic circuitry contained in an annular electronic cavity 25. The (dp/dt) switch 24 is responsive to the time rate of change of drilling fluid pressure. This switch, which is conventional, will operate if, and only if, the pressure of the drilling fluid changes a predetermined amount in a fixed time interval.

Having accepted the activating command from the surface, the down-hole instrumentation will carry out, automatically, the following sequence:

(a) Energize a transducer (EG: Temperature to voltage) contained in the transducer housing 26.

(b) Convert the voltage analog (the output of the transducer) to a digital word, in which binary 1's and 0's are identified by discrete voltage levels. This digital word is then temporarily stored in a shift register (not illustrated) in the electronic cavity 25.

(c) In a timing sequence consistent with the practicality of the system, serialize the digital word by applying clock pulses to the shift register.

(d) By means of buffering and power amplifiers, (not illustrated) use the serial digital word to activate the motor of the motor/valve 27, whereby a portion of the drilling fluid is permitted to exit from the wash-pipe 23 and enter the annulus 19 without having passed through the restrictive nozzles in the drill bit 11. Because the valve is actuated by the digital word derived from the transducer, the releasing of the drilling fluid from the wash-pipe to the annulus will occur in a sequence of GO/NO-GO events indicative of the physical measurement made by the transducer.

The electrical power required to carry out the foregoing operations is provided (typically) by a battery of dry cells (not illustrated) contained in the annular power supply cavity 28. Electrical cabling 29 is used to interconnect the various components and devices constituting the instrumentation package. The three functional cavities 25, 28 and 30 are separated by means of seals 31 and 32. Alternatively, it is preferable that these cavities or components are each a self-contained module having closed ends, and screw threadably connected together to form the complete "sub" 21, in order to isolate the cavities from one another in the event that a seal 31 ruptures for example, as the drilling fluid would damage or destroy the electronics and/or power supply.

In the event that a plurality of down-hole measurements are to be made, the apparatus is expandable to include sampling and multiplexing circuitry (well known in the electronics art) such that a series of identifiable digital words, each word reflecting the output of a specific measurement transducer, may be used to activate the valve 27 in a sequential manner as previously described.

Having established that the present apparatus will, on command from the surface; cause a portion of the drilling fluid to be sequentially released from the interior of the drill string 10 into the annulus 19 in such a way as to digitally conform to the measurement of physical quantities in a down-hole location, we now proceed to a description of the means whereby the said digital information is transmitted to the earth's surface and there received and displayed.

Figure 6:
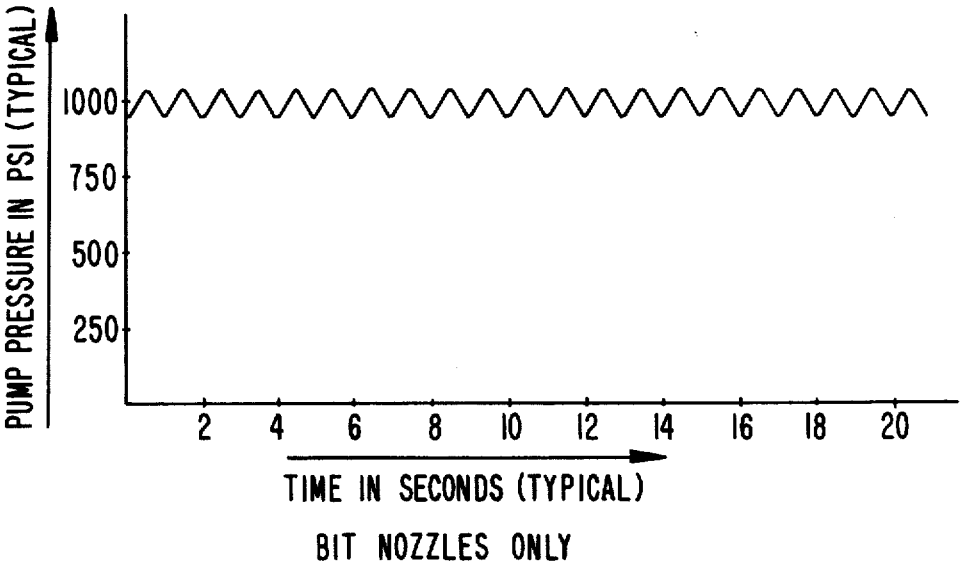
FIG. 6 is a diagram of the voltage analog of pump pressue vs time as detected by the surface receiving apparatus with the down-hole valve closed.

In FIG. 6 there is shown a plot that is typical of PUMP PRESSURE vs TIME as experienced in normal well drilling operations. The average pump pressure is shown to be 1000 psi, with cyclic variations above and below this value caused by the reciprocating motion of the piston in the pump. As previously mentioned, this pressure is applied to overcome the resistance offered by the nozzles in the drill bit 11.

Figure 7:
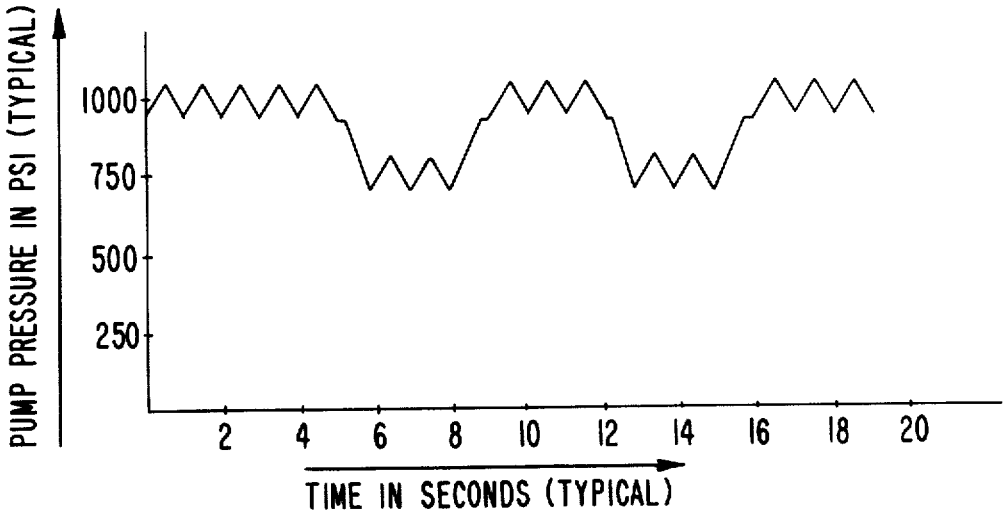
FIG. 7 is a diagram of the voltage analog of pump pressure vs time as detected by the surface receiving apparatus with the down-hole valve opened, and closed.

In FIG. 7 there is shown a plot of the reaction of pump pressure when the down-hole valve 27 of the present invention is opened. Assuming that there are three nozzles 11A (of equal size) in the drill bit 11, and that the valve controlled path affords a drilling fluid throughput (from the wash-pipe 23 to the annulus 19) that is equivalent to one of the bit nozzles, then the opening of the valve 27 will cause a net 25% decrease in pump pressure. In FIG. 7 the opening of the valve commences at $t=5$ seconds and requires approximately 1 second to open fully. Commencing at $t=6$ seconds, then, the average pump pressure is seen to be 750 psi. At $t=8$ seconds the valve starts to close, and is completely closed at $t=9$ seconds, at which time the pump pressure returns to its original average value of 1000 psi. At $t=12$ seconds the sequence is repeated. In each of the two cases, the valve is fully open for a total of 2 seconds.

The timing of the valve opening and closing events will be influenced by various factors and is therefore made variable in this apparatus. For example, a particular drilling rig may include a surge suppressor in the drilling fluid circulating system, and this compressed air device will tend to integrate the pressure waves that form the basis for the present communications medium. To overcome this effect, the down-hole valve is caused to remain open for a period that compensates for the time constant of the integrating surge suppressor, and may, as a result, require a slightly longer time to transmit a given digital word.

In the present invention, a pressure to voltage transducer 22A is installed in the pipe 18A between the pump and stand-pipe 18. The object of this transducer is to provide, on a continual basis, a voltage that is analogous to the pressure applied to the drilling fluid by the rig's pump. The voltage output of this transducer is automatically monitored by electronics circuitry 22B such that significant pressure decreases, caused by the opening of the down-hole valve 27 are detected.

Operating in conjunction with the transducer electronics there is a surface "RECEIVER" 22C as shown in FIG. 2. This receiver contains electronics circuitry that will establish, by means of timing pulses, the validity of the information as reported by the pressure transducer 22A. If the information is valid, it will be processed by the receiver 22C and subsequently transferred to a "read-out" means 22D in a format that is meaningful to the rig operator.

To summarize the present invention, a measurement of one or more down-hole parameters is made and digitized; the digital word is used to release drilling fluid from the interior of the drill string to the annulus in a sequence conforming to the digital word; the resulting decrease in pump pressure is detected at the earth's surface, and presented to the rig operator in a meaningful way.

Since various modifications can be made in our invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What we claim as our invention is:

[1. A method of telemetering information from a point in a well bore-hole, to the earth's surface utilizing the drilling fluid pump pressure comprising the steps of detecting the information required, translating and transmitting said information into digital signals, decreasing and then increasing the pump pressure by venting the drilling fluid in a binary coded decimal format, by said digital signals, remotely detecting said decreases and increases of drilling fluid pump pressure and then decoding and displaying the results of said increases and decreases of said drilling fluid pump pressure and hence the information detected, said translation and transmitting of the information being initiated by the additional step of first decreasing and then increasing the drilling fluid pump pressure at the surface in a predetermined sequence.]

[2. In a well drilling rig which includes a hollow drill string assembly within a bore-hole thereby defining a bore-hole annulus, a rotatable bit on the lower end of said hollow drill string, drill fluid restrictive nozzles in said bit, a drilling fluid circulation system including a pump and a source of drilling fluid, and conduit means operatively connecting said pump to said source of drilling fluid and to said hollow drill string; the improvement comprising in combination a down-hole assembly installed within the associated drill string, means to convey the associated drilling fluid under pressure, through said assembly, a motorized valve within said assembly operatively connected between said means to convey associated drilling fluid through said assembly and the associated bore-hole annulus when the valve is open and to shut off said last mentioned means when said valve is closed, at least one information responsive transducer operatively connected to said assembly, electronic means in said assembly to translate information received by said transducer, into means to open and close said valve in a binary coded decimal sequence thereby decreasing and increasing the drilling fluid pressure in said predetermined sequence, means remote from said assembly to detect said decreases and increases in drilling fluid pressure and means to decode and display said detected decreases and increases in drilling fluid pressure, and a source of electrical power for said assembly.]

[3. The assembly according to claim 2 which includes a rate of pressure change switch operatively connected to said motorized valve whereby said valve only operates responsive to a decrease and increase in pressure if the pressure of the drilling fluid changes a predetermined amount in a fixed time or period.]

[4. The assembly according to claim 2 in which the assembly includes a cylindrical casing, a drilling fluid conduit extending through said casing, an annular cavity defined between said conduit and said casing, said conduit being offset through part of said casing, said casing including an electronic holding section within said cavity, an electro-mechanical holding section within said cavity adjacent said offset, and a power supply holding section within said cavity, and means to seal off said cavities one from the other, said casing being adjacently connected within said drill string.]

[5. The assembly according to claim 2 in which said electronic means in said assembly translates information received by said transducer into digital signals for opening and closing said valve.]

[6. The assembly according to claim 5 which includes remote input means operatively connected to said drilling fluid circulation system to decrease and then increase the associated pump pressure in a sequence to which said means to open and close said valve is responsive thereby initiating the operation of said valve to signal information received from said transducer within said assembly, to said means to decode and display said detected decreases and increases in said drilling fluid pump pressure.]

[7. The assembly according to claim 5 in which the assembly includes a cylindrical casing, a drilling fluid conduit extending through said casing, an annular cavity defined between said conduit and said casing, said conduit being offset through part of said casing, said casing including an electronic holding section within said cavity, an electromechanical holding section within said cavity adjacent said offset, and a power supply holding section within said cavity, and means to seal off said cavities one from the other, said casing being adjacently connected within said drill string.]

[8. The assembly according to claim 3 in which the assembly includes a cylindrical casing, a drilling fluid conduit extending through said casing, an annular cavity defined between said conduit and said casing, said conduit being offset through part of said casing, said casing including an electronic holding section within said cavity, an electromechanical holding section within said cavity adjacent said offset, and a power supply holding section within said cavity and means to seal off said cavities one from the other, said casing being adjacently connected within said drll string.]

[9. The assembly according to claim 5 which includes said means remote from said assembly comprising a pressure-to-voltage transducer operatively connected to said conduit means between said pump and said hollow drill string, electronic means to receive and decode signals from said pressure-to-voltage transducer, operatively connected to said transducer and readout means operatively connected to said electronic means.]

[10. The assembly according to claim 9 which includes remote input means operatively connected to said drilling fluid circulation system to decrease and then increase the associated pump pressure in a sequence to which said means to open and close said valve is responsive thereby initiating the operation of said valve to signal information received from said transducer within said assembly, to said means to decode and display said detected decreases and increases in said drilling fluid pump pressure.]

[11. The assembly according to claim 2 which includes said means remote from said assembly comprising a pressure-to-voltage transducer operatively connected to said conduit means between said pump and said hollow drill string, electronic means to receive and decode signals from said pressure-to-voltage transducer, operatively connected to said transducer and read-out means operatively connected to said electronic means.]

[12. The assembly according to claim 11 which includes remote input means operatively connected to said drilling fluid circulation system to decrease and then increase the associated pump pressure in a sequence to which said means to open and close said valve is responsive thereby initiating the operation of said valve to signal information received from said transducer within said assembly, to said means to decode and display said detected decreases and increases in said drilling fluid pump pressure.]

[13. The assembly according to claim 2 which includes remote input means operatively connected to said drilling fluid circulation system to decrease and then increase the associated pump pressure in a sequence to which said means to open and close said valve is responsive thereby initiating the operation of said valve to signal information received from said transducer within said assembly, to said means to decode and display said detected decreases and increases in said drilling fluid pump pressure.]

[14. The assembly according to claim 13 in which the assembly includes a cylindrical casing, a drilling fluid conduit extending through said casing, an annular cavity defined between said conduit and said casing, said conduit being offset through part of said casing, said casing including an electronic holding section within said cavity, an electro-mechanical holding section within said cavity adjacent said offset, and a power supply holding section within said cavity, and means to seal off said cavities one from the other, said casing being adjacently connected within said drill string.]

[15. An information and transmitting assembly for rotary oil well drilling string comprising in combination a cylindrical casing, a drilling fluid conduit extending through said casing, an annular cavity defined between said conduit and said casing, said conduit being offset through part of said casing, a down-hole assembly installed within said casing, a motorized valve within said casing adjacent said offset, said valve being operatively connected between said conduit and the exterior of said casing when said valve is open and shutting off the connection between said conduit and the exterior of said casing, when said valve is closed, at least one information responsive transducer within said casing, electronic means in said casing to translate information received by said transducer into means to open and close said valve in a binary coded decimal system thereby decreasing and increasing the drilling fluid pressure within said conduit, means remote from said casing to detect decreases and increases in drilling fluid pressure and means to decode and display said detected decreases and increases in drilling fluid pressures and a source of electrical power within said casing.]

[16. The assembly according to claim 15 which includes remote input means operatively connected to said drilling fluid circulation system to decrease and then increase the associated pump pressure in a sequence to which said means to open and close said valve is responsive thereby initiating the operation of said valve to signal information received from said transducer within said assembly, to said means to decode and display said detected decreases and increases in said drilling fluid pump pressure.]

[17. The assembly according to claim 15 which includes a rate of pressure change switch operatively connected to said motorized valve whereby said valve only operates responsive to a decrease and increase in pressure if the pressure of the drilling fluid changes a predetermined amount in a fixed time or period.]

[18. The assembly according to claim 15 in which the assembly includes a cylindrical casing, a drilling fluid conduit extending through said casing, an annular cavity defined between said conduit and said casing, said conduit being offset through part of said casing, said casing including an electronic holding section within said cavity, an electromechanical holding section within said cavity adjacent said offset, and a power supply holding section within said cavity, and means to seal off said cavities one from the other, said casing being adjacently connected within said drill string.]

[19. The assembly according to claim 15 in which said electronic means in said assembly translates information received by said transducer, into digital signals for opening and closing said valve.]

[20. The assembly according to claim 19 which includes remote input means operatively connected to said drilling fluid circulation system to decreae and then increase the associated pump pressure in a sequence to which said means to open and close said valve is responsive thereby initiating the operation of said valve to signal information received from said transducer within said assembly, to said means to decode and display said detected decreaes and increases in said drilling fluid pump pressure.]

[21. The assembly according to claim 19 which includes said means remote from said assembly comprising a pressure-to-voltage transducer operatively connected to said conduit means between said pump and said hollow drill string, electronic means to receive and decode signals from said pressure-to-voltage transducer, operatively connected to said transducer and read-out means operatively connected to said electronic means.]

[22. The assembly according to claim 21 which includes remote input means operatively connected to said drilling fluid circulation system to decrease and then increase the associated pump pressure in a sequence to which said means to open and close said valve is responsive thereby initiating the operation of said valve to signal information received from said transducer within said assembly, to said means to decode and display said detected decreases and increases in said drilling fluid pump pressure.]

[23. The assembly according to claim 15 which includes said means remote from said assembly comprising a pressure-to-voltage transducer operatively connected to said conduit means between said pump and said hollow drill string, electronic means to receive and decode signals from said pressure-to-voltage transducer, operatively connected to said transducer and read-out means operatively connected to said electronic means.]

[24. The assembly according to claim 23 which includes remote input means operatively connected to said drilling fluid circulation system to decrease and then increase the associated pump pressure in a sequence to which said means to open and close said valve is responsive thereby initiating the operation of said valve to signal information received from said transducer within said assembly, to said means to decode and display said detected decreases and increases in said drilling fluid pump pressure.]

*25. A method of telemetering information from a point in a well borehole to the earth'surface by utilizing a drill string extending into the borehole, and thereby defining a borehole annulus, a drill bit on one end of the drill string having at least one restrictive nozzle therein, a drilling fluid pump connected to the other end of the drill string, an assembly connected in the drill string and having an unobstructed passage therethrough, a bypass passageway in the assembly directly communicating the unobstructed passage to the borehole annulus and a motorized valve in said bypass passageway, the method comprising the steps of continuously pumping drilling fluid under pressure through the drill string, through the unobstructed flow passage and out through the drill bit nozzle, detecting at a point in the borehole the information to be telemetered, translating and transmitting said information into digital signals, using said digital signals in operating said valve to plurally decrease and increase the fluid pressure in the drilling string by plurally opening and closing the valve in the bypass passageway in a coded decimal format thereby venting a portion of the drilling fluid directly into the borehole annulus and bypassing the drill bit nozzle with said portion of fluid while maintaining continuous unobstructed drilling fluid flow through the assembly and continuous flow through the drill bit nozzle, detecting the decreases and increases in the drilling fluid pressure while continuously circulating the drilling fluid and decoding and displaying at the surface the results of the decreases and increases in drilling fluid pump pressure.*

*26. In a well drilling system which includes a hollow drill string within a borehole thereby defining a borehole annulus, a drill bit on one end of said hollow drill string, at least one drilling fluid restrictive nozzle in said bit, a drilling fluid circulation system including a surface pump and a source of drilling fluid, and conduit means operatively connecting said pump to said source of drilling fluid and to the other end of said hollow drill string; the improvement comprising in combination, a down-hole assembly having means connecting the assembly in the drill string, a continuous unobstructed passage through said assembly in communication with said drill string, a bypass passageway in said assembly directly communicating the unobstructed passage in the assembly to the borehole annulus and bypassing said drill bit nozzle, a motorized valve in the bypass passageway for controlling fluid flow directly to the associated borehole annulus when the valve is open and to shut off said last mentioned flow when said valve is closed, at least one information responsive transducer operatively connected to said assembly, means in said assembly to translate information received by said transducer into means to plurally open and close said valve in a coded decimal sequence thereby plurally decreasing and increasing the drilling fluid pressure in said sequence, means remote from said assembly to detect said decreases and increases in drilling fluid pressure, means operatively connected to said detecting means to decode said detected decreases and increases in drilling fluid pressure and means at the surface to display the decoded information.*

* * * * *